United States Patent
Lohss et al.

(10) Patent No.: US 6,231,219 B1
(45) Date of Patent: May 15, 2001

(54) DUAL-PURPOSE GLOVEBOX LIGHT ASSEMBLY AND CRADLE THEREFOR

(76) Inventors: Kurt L. Lohss, 795 E. Lake Rd., Pentwater, MI (US) 49449; Ronald L. Clairmont, II, 2968 Eighth St., Shelbyville, MI (US) 49344

( * ) Notice: Subject to any disclaimer, the term of this patent is extended or adjusted under 35 U.S.C. 154(b) by 0 days.

(21) Appl. No.: 09/517,815

(22) Filed: Mar. 2, 2000

Related U.S. Application Data

(60) Provisional application No. 60/122,539, filed on Mar. 3, 1999.

(51) Int. Cl.[7] .............................. B60Q 3/02; F21L 15/08
(52) U.S. Cl. .......................... 362/486; 362/489; 362/191
(58) Field of Search .................................. 362/488, 489, 362/487, 486, 190, 191, 516, 200, 201, 183

(56) References Cited

U.S. PATENT DOCUMENTS

| | | | |
|---|---|---|---|
| 4,462,064 | * 7/1984 | Schweitzer | 362/191 |
| 4,713,735 | 12/1987 | Hiltman . | |
| 4,819,134 | 4/1989 | Rossi . | |
| 4,819,139 | 4/1989 | Thomas . | |
| 4,825,345 | 4/1989 | Stevens . | |
| 4,974,129 | 11/1990 | Grieb et al. . | |
| 5,077,643 | 12/1991 | Leach . | |
| 5,119,280 | 6/1992 | Yang . | |
| 5,303,131 | * 4/1994 | Wu | 362/191 |
| 5,593,074 | * 1/1997 | Matthews | 362/191 |
| 5,645,340 | 7/1997 | Colton . | |
| 5,831,413 | 11/1998 | Gould . | |
| 5,908,233 | 6/1999 | Heskett et al. . | |
| 5,984,495 | * 11/1999 | Roberts et al. | 362/486 |
| 6,079,858 | * 6/2000 | Hicks | 362/486 |

* cited by examiner

Primary Examiner—Thomas M. Sember
(74) Attorney, Agent, or Firm—Lynn E. Cargill; Susan M. Cornwall

(57) ABSTRACT

A cradle for holding a flashlight in a glovebox of an automobile and for facilitating the use of the flashlight as a light for the glovebox. The cradle has an opening to allow the flashlight to slide in and out of the cradle and a light opening to allow light from the flashlight to shine through the cradle. The cradle includes a reflector to cause light from the flashlight to be reflected in a different direction. The cradle can have a tapered inner surface on a side adjacent the insertion opening. The tapered inner surface is to increase the snugness of the fit of the flashlight and, when the flashlight has a push button switch, the tapered inner surface can serve to deactivate the flashlight when the flashlight is inserted into the cradle. A light assembly includes a flashlight and a cradle for holding the flashlight and for mounting the light assembly in a glovebox of an automobile.

20 Claims, 5 Drawing Sheets

US 6,231,219 B1

DUAL-PURPOSE GLOVEBOX LIGHT ASSEMBLY AND CRADLE THEREFOR

This patent application claims the benefit of prior filed U.S. Provisional Patent Application No. 60/122,539 filed on Mar. 3, 1999, now abandoned, which Provisional Patent Application is incorporated by reference herein.

TECHNOLOGICAL FIELD

The present invention relates to a dual-purpose glovebox light assembly and a cradle useful for the light assembly. The light assembly serves as a light for a glovebox of an automobile and includes a cradle and a flashlight. The flashlight is removable. The cradle of the light assembly which is to be permanently installed inside the glovebox to hold the flashlight during normal use.

BACKGROUND OF THE INVENTION

Often times a driver or passenger of an automobile is in need of a flashlight. For example, when changing a flat tire or attending to some other emergency in the dark or when searching under the seats for a missing item. However, it is typical that either a flashlight is not available or, if a flashlight is available, the batteries are dead, making the flashlight useless.

SUMMARY OF THE INVENTION

It is, therefore, desirable to provide a flashlight which is stored in an automobile. It is even more desirable to have the flashlight work dependably and yet most desirable to have the flashlight serve another purpose.

The present invention seeks to provide a dual-purpose light assembly which serves as a flashlight and as a light for a glovebox of an automobile.

Another advantage being sought by the present invention is to provide an aesthetic structure for securely, yet removably attaching a flashlight in a glovebox.

Yet another advantage being sought by the present invention is making the flashlight rechargeable by the automobile's battery.

Still another advantage being sought by the present invention is providing structure on the flashlight that renders using the flashlight easier.

A further advantage being sought by the present invention is providing a way by which the flashlight will be turned off when placed in the light assembly in the glovebox.

In accordance with the present invention, one embodiment is a cradle for holding a flashlight in a glovebox of an automobile and for facilitating the use of the flashlight as a light for the glovebox. The cradle includes a plurality of connecting sides defining a cavity for holding the flashlight. One of the sides has an insertion opening to allow the flashlight to slide in and out of the cavity and a light opening to allow light from the flashlight to shine through the cradle. The cradle also includes a reflector attached to the cradle near the light opening to cause light from the flashlight to be reflected in a direction different from the direction the light is coming from the flashlight.

Another embodiment of the present invention is also a cradle for holding a flashlight in a glovebox of an automobile and for facilitating the use of the flashlight as a light for the glovebox. Like the first embodiment, the cradle includes a plurality of connecting sides defining a cavity for holding the flashlight. Also like the first embodiment, one of the sides of the cradle has an insertion opening to allow the flashlight to slide in and out of the cavity and a light opening to allow light from the flashlight to shine through the cradle. However, this embodiment has a tapered inner surface on a side adjacent the side with the insertion opening. The taper gradually projects more inward in the direction from the insertion opening toward the side opposite the insertion opening. The tapered inner surface is present to gradually increase the snugness of the fit of the flashlight as it is being inserted into the cradle and has other advantages as well.

Other embodiments of the present invention are dual-purpose light assemblies for gloveboxes of automobiles. Each light assembly includes a flashlight and a cradle for holding the flashlight. The flashlight includes a housing, a power supply inside the housing, a switch mounted on the housing, and a light source in the housing. The light source is controllable by the switch. The cradle can be either the first or second embodiment described above or a combination thereof.

Other advantages of the present invention will be readily appreciated as the same becomes better understood after reading the subsequent description taken in conjunction with the appendant drawings.

DETAILED DESCRIPTION OF THE INVENTION

Figure 1:
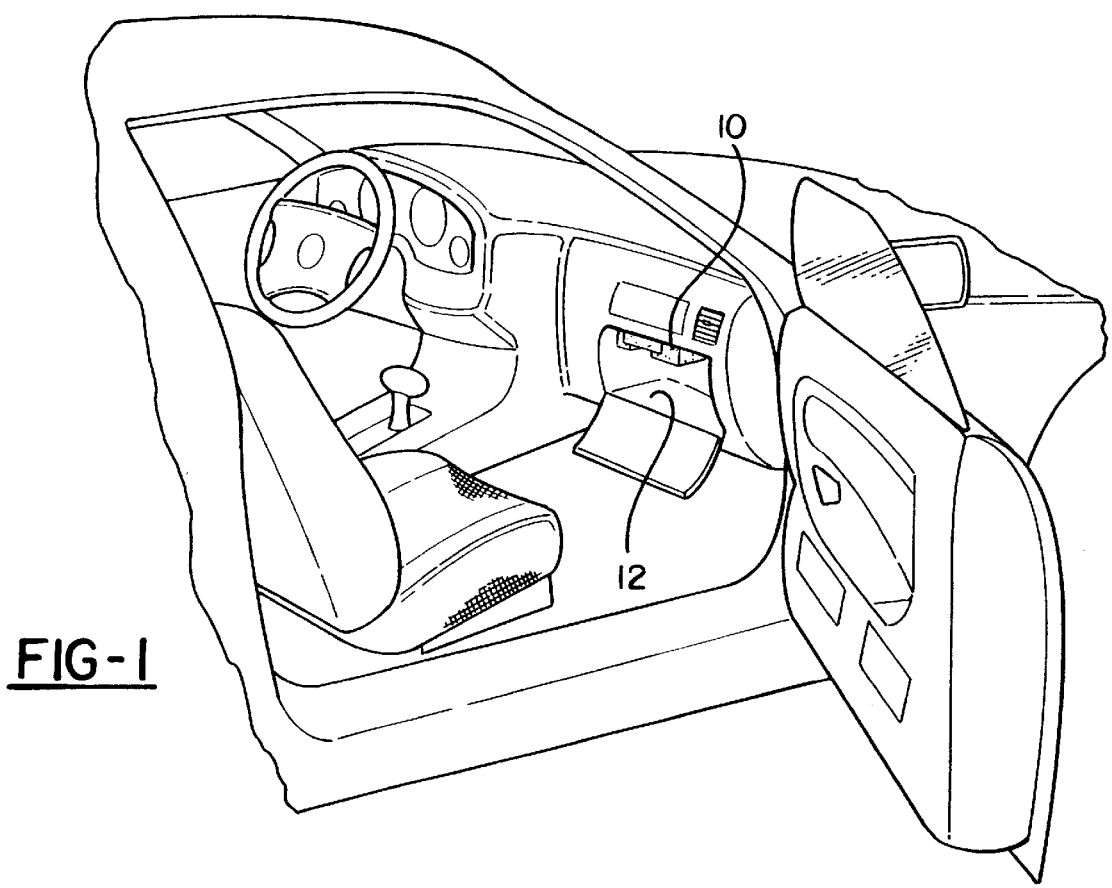
FIG. 1 is a perspective view of a light assembly according to the present invention shown in place inside a glovebox of an automobile (automobile shown in part)

The present invention generally entails a dual-purpose light assembly for a glovebox of an automobile and a cradle useful for the light assembly. The light assembly serves as both a light for the glovebox and a flashlight. FIG. 1 illustrates light assembly 10 according to the present invention mounted in typical glovebox 12 in an automobile. Light assembly 10 may be mounted in the glovebox in any suitable manner, such as, with screws. Light assembly 10 normally illuminates glovebox 12 when the glovebox door is open and shuts off when the glovebox door is closed. Although assembly 10 is shown mounted on the roof of glovebox 12, it is conceivable that the assembly of the present invention may be mounted in other locations of the glovebox.

Figure 2:
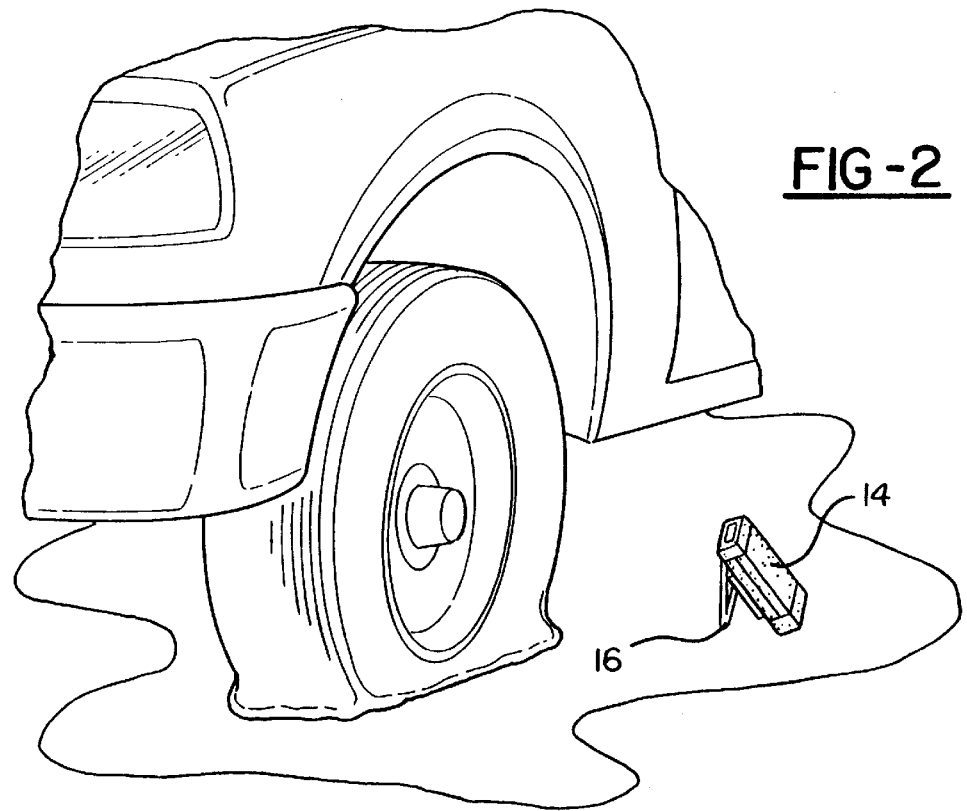
FIG. 2 is a perspective view of a flashlight shown in use, the flashlight in accordance with an element of the present invention.

Although not shown together until later drawings, assembly 10 includes a cradle and a flashlight. The flashlight is shown in FIG. 2 and designated by reference numeral 14. Flashlight 14 is shown resting on the ground and illuminating a flat tire on an automobile. Flashlight 14 includes bail 16 which is pivotally mounted on flashlight 14 and is available for adjusting a resting position for flashlight 14.

Figure 3:
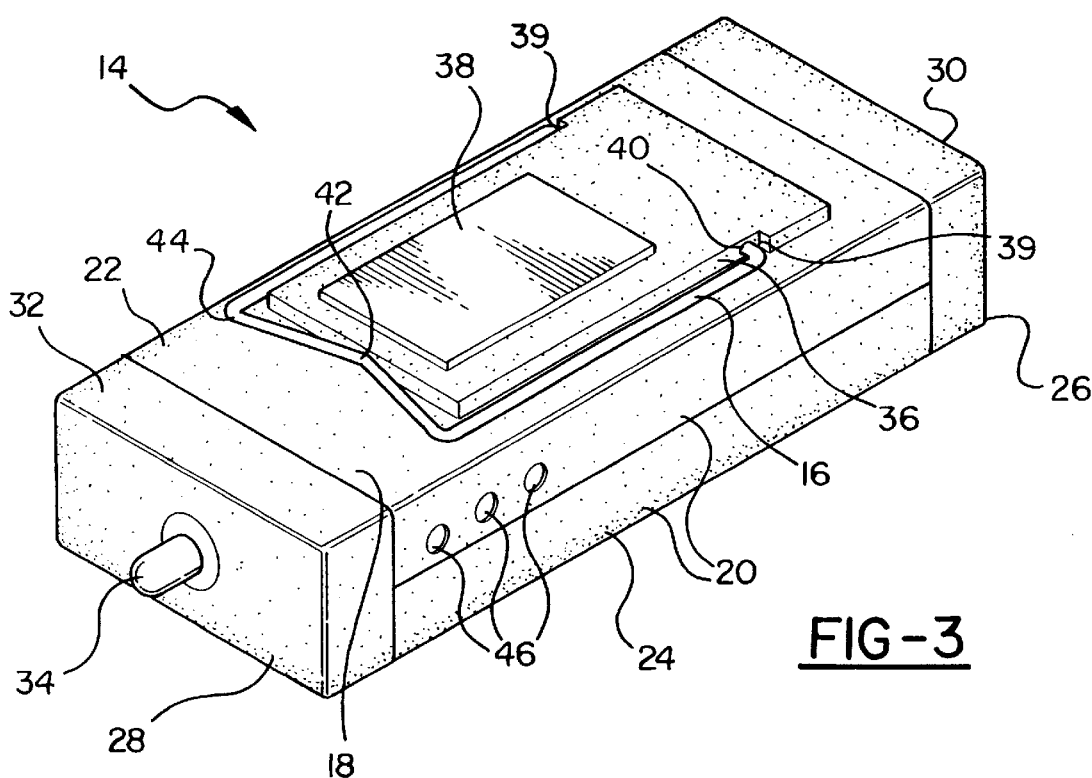
FIG. 3 is a perspective view of the flashlight shown in FIG. 2.

FIG. 3 is a perspective view of flashlight 14 which includes housing 18 formed from clam-shell segments 20. Preferably, flashlight 14 is water resistant. Flashlight 14 is shown resting on its top side. Flashlight has four sides which includes bottom side 22 and side 24 (the top side and other side are not shown in this figure) and ends 26 and 28. End 26 has lens cap 30 which encloses a light source, and end 28 has switch cap 32 which houses a switching device. Projecting through switch cap 32 is switch 34 which controls the light source. Preferably, switch 34 is a push button switch. Most preferably, switch 34 is a push button switch which deactivates the flashlight when the switch is continuously depressed. Otherwise, in the most preferred switch, the flashlight alternatively turns on and off with each time the push button switch is pushed in and released. Switch 34 may also be positioned at some other location on flashlight 14, if desired, although what is shown is the preferred location.

Flashlight 14 also has platform 36 on bottom side 22 which projects outwardly from housing 18. Attached to platform 36 is magnet 38 which is useful when it is desirable to attach flashlight 14 to a side of an automobile or some other metal surface. Preferably, magnet 38 is formed of a non-scratching material, e.g., vinyl-coated magnetic material.

Also attached to platform 36 is bail 16 which is pivotally attached to platform 36 at pivot point 40. Bail 16 is shown in the closed position in this figure. Bail 16 is attached to platform 36 next to extensions 39 on each side of platform 36. Extensions 39, which render platform 36 generally "T" shaped, are present to keep bail 16 from flipping all the way over (180°). Bail 16 is generally rectangular but includes indention 42 in the middle of free end 44. Indention 42 serves to allow press-fitting of bail 16 onto platform 36 and to make it easier to grab and disengage it from platform 36.

On side 24 of flashlight 14 are terminals 46 whose purpose will be discussed hereinbelow.

Figure 4:
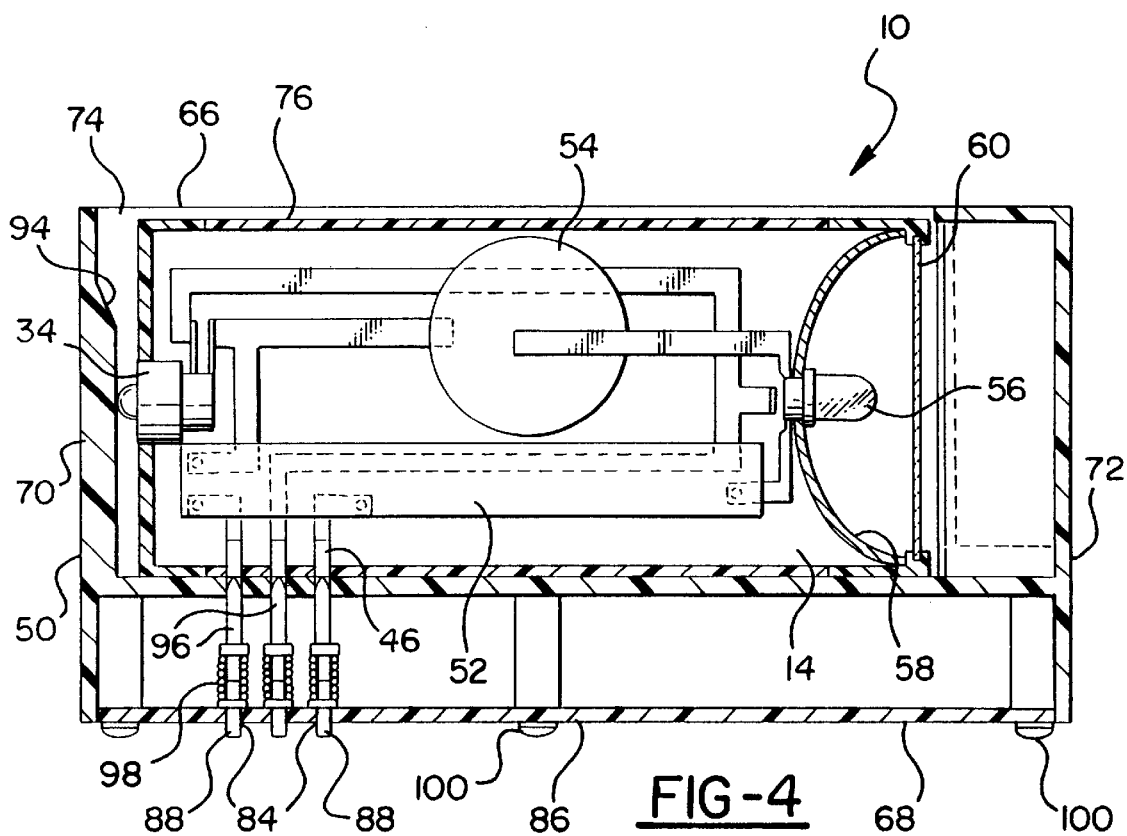
FIG. 4 is a sectional view of a light assembly according to the present invention.

FIG. 4 shows a cross sectional view of dual purpose light assembly 10 which includes flashlight 14 and cradle 50. Cradle 50 will be described more thoroughly hereinbelow. First, the components of flashlight 14 will be discussed.

Starting from the left, flashlight 14 includes switch 34, terminals 46, flashlight printed circuit board (PCB) 52, rechargeable battery 54, lamp 56, lamp reflector 58, and lens 60. Also inside flashlight 14 are various electrical connections (unnumbered) connecting terminals 46, PCB 52, switch 34, battery 54, and lamp 56. Although a rechargeable battery is included in this embodiment, it is conceivable that a non-rechargeable battery may be used in the flashlight. In this case, any reference to charging of the battery would be irrelevant. Preferably, the lamp exhibits about one (1) candlepower, although significantly less or more is also useful.

Figure 5A:
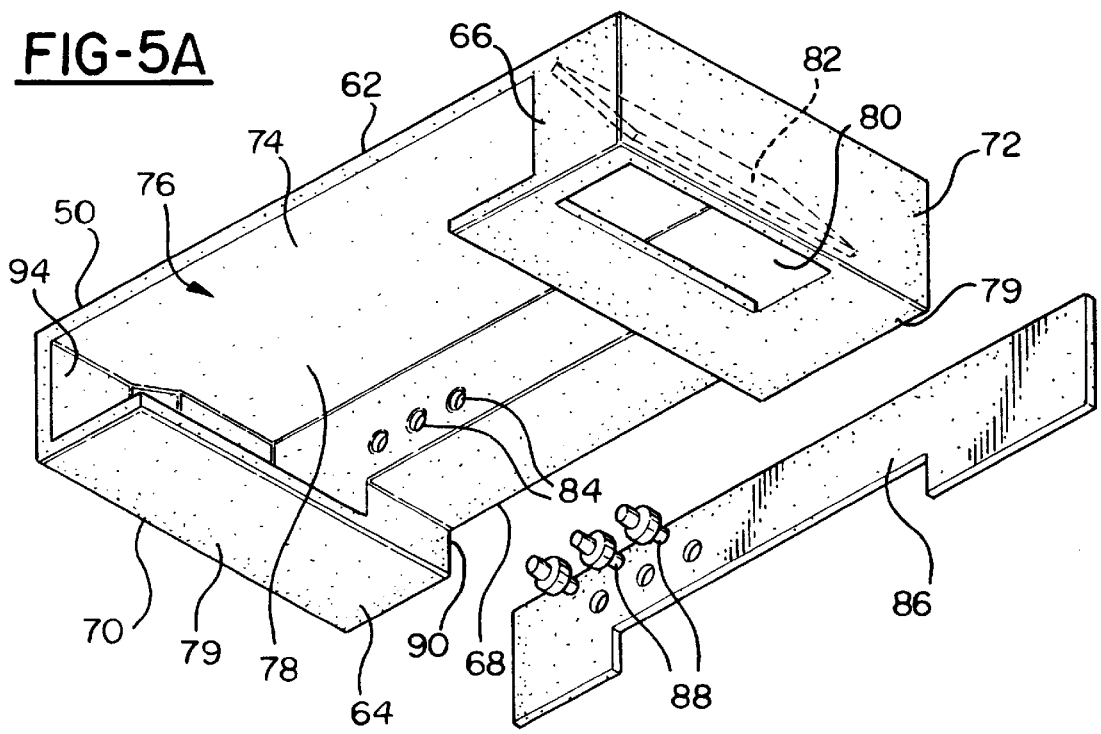
FIG. 5A is a perspective view of a cradle in accordance with the present invention.

FIG. 5A is a perspective front view of cradle 50. Cradle 50 has top side 62, bottom side 64, front side 66, back side 68, end 70 and end 72. All of the sides are rectangular, and top side 62, bottom side 64, front side 66, and back side 68 are elongated. The sides form cavity 74 in which flashlight 14 may be stored. Front side 66 has insertion opening 76 sized to allow flashlight 14 to slide in and out of cradle 50. Bottom side 64 has accessory opening 78 which is present to allow platform 36, bail 16, and magnet 38 to project out of cradle 50 when flashlight 14 is stored therein. Bottom side 64 also has support members 79 which support flashlight 14 when inserted therein. Preferably, support members 79 are each at least one-eighth of the length of flashlight 14. Bottom side 64 also has opening 80 near end 72 which is present for light from the flashlight to shine through.

Cradle 50 includes reflector 82 which is securely positioned inside cradle 50 and positioned such that light from flashlight 14 will be reflected to shine through opening 80. A reflector, such as reflector 82, is optional for some embodiments.

Figure 5B:
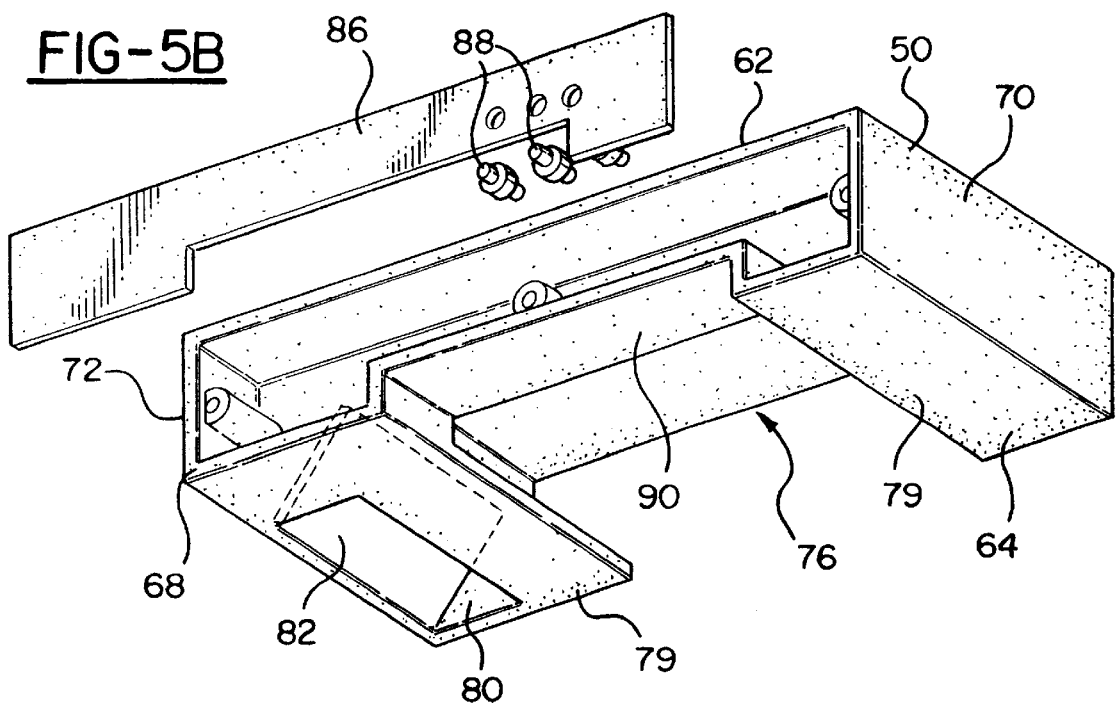
FIG. 5B is another perspective view of the cradle of FIG. 5A.

At back side 68 are terminal holes 84. Shown in exploded position is cradle PCB 86 and terminals 88. Back side 68 also includes cutaway portion 90 at the bottom edge thereof. Cutaway portion 90 extends higher than the upper surface of support members 79. It can be seen that cut away portion 90, opening 78, and insertion opening 76 are connected with each other so as to form one large opening. FIG. 5B shows a perspective back view of cradle 50 and cradle PCB 86.

Figure 5C:
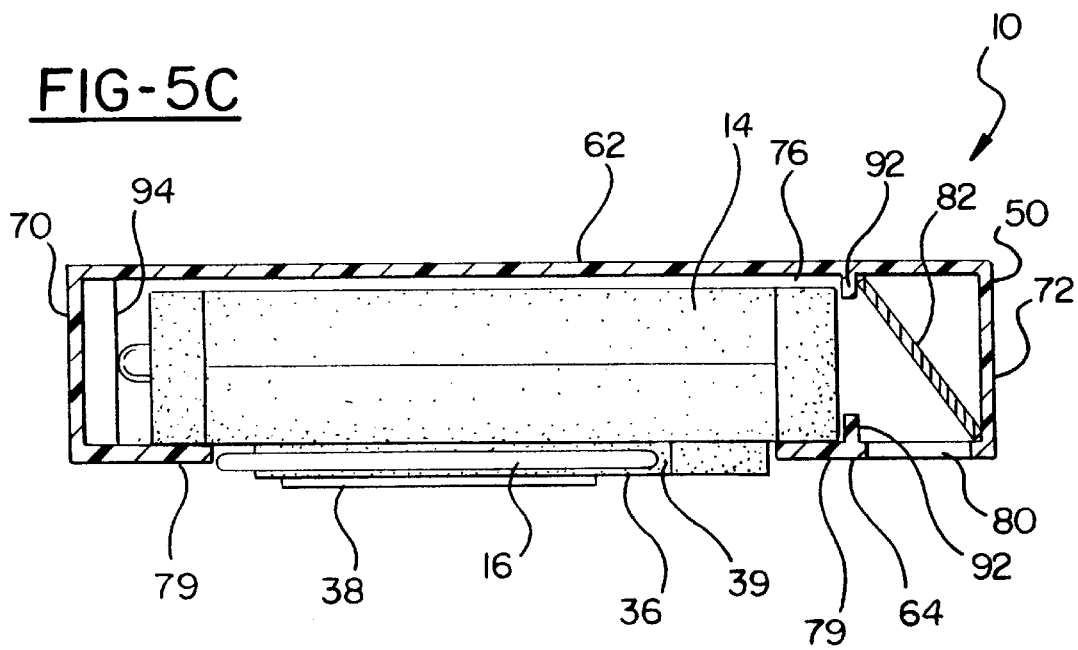
FIG. 5C is a partial cross sectional side view of a light assembly according to the present invention.

FIG. 5C shows a side view of flashlight 14 inside cradle 50 (shown sectionally to illustrate reflector 82. Inside cradle 50 near end 72 are partial walls 92 which help hold flashlight 14 and reflector 82 in place. To remove flashlight 14 from cradle 50, one merely reaches under and to the back side of cradle 50 and grabs hold of flashlight 14 which is accessible via cutaway portion 90 of cradle 50. Next, flashlight 14 is pulled toward the front (open) side of cradle 50. Cradle 50 is designed to allow a person's hand to grab the flashlight and pull it through by the continuous opening between cutaway portion 90 and opening 78 at the bottom of cradle 50.

To reinsert flashlight 14 into cradle 50, one merely aligns the light source end 26 of the flashlight with end 72 of the cradle which has light opening 80 nearby and pushes flashlight 14 into insertion opening 76 of cradle 50. Flashlight 14 and cavity 74 are sized and shaped so that flashlight 14 fits snugly in cavity 74.

Returning to FIG. 4, cradle 50 has inner surface 94 at end 70 adjacent insertion opening 76. Inner surface 94 is tapered to gradually project more inward in the direction from the insertion opening toward the side opposite. Tapered inner surface 94 is present to gradually depress push button switch 34 and maintain the depressed position to deactivate the flashlight which is especially useful in the event the flashlight has been left on. By shutting off flashlight 14, battery 54 is free to be charged by the automobile battery. Another advantage to having tapered inner surface 94 is that the fit of flashlight 14 inside cradle 50 becomes more snug and secure as flashlight 14 is fully inserted. The snug fit of flashlight 14 in cradle 50 insures that flashlight 14 does not rattle or become disengaged when the automobile is operating.

Also seen in FIG. 4 are flashlight terminals 46 electrically connected to cradle terminals 88 via floating pins 96 and springs 98. A closer view of the floating pin configuration can be seen in FIG. 6.

Cradle PCB 86 is attached to back side 68 of cradle 50 via screws 100 or any other suitable fastener.

Figure 6:
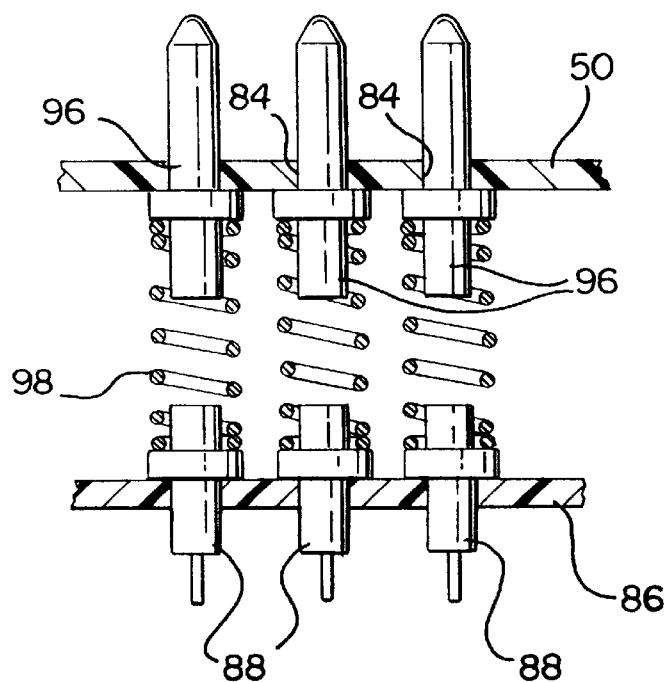
FIG. 6 is a side elevational view of hardware which can be part of the electronic circuitry used for the present invention.

FIG. 6 illustrates some of the hardware used in electrically connecting flashlight 14 to cradle 50. In the Figure, the lower horizontal surface is cradle PCB 86. Terminals 88 extend through holes in cradle PCB 86. Terminals 88 have leads at the bottom thereof which would be connected to the automobile's electrical system.

The upper horizontal surface in FIG. 6 is the back wall of cradle 50 which has terminal holes 84 therethrough. Floating pins 96 extend through terminal holes 84 and are connected to terminals 88 via springs 98. When flashlight 14 is placed in cradle 50 so that terminals 46 on flashlight 14 align with floating pins 96 in cradle 50, floating pins 96 are forced toward PCB 86, compressing springs 98. The use of floating pins helps insure good electrical connection between flashlight 14 and cradle 50.

Figure 7:
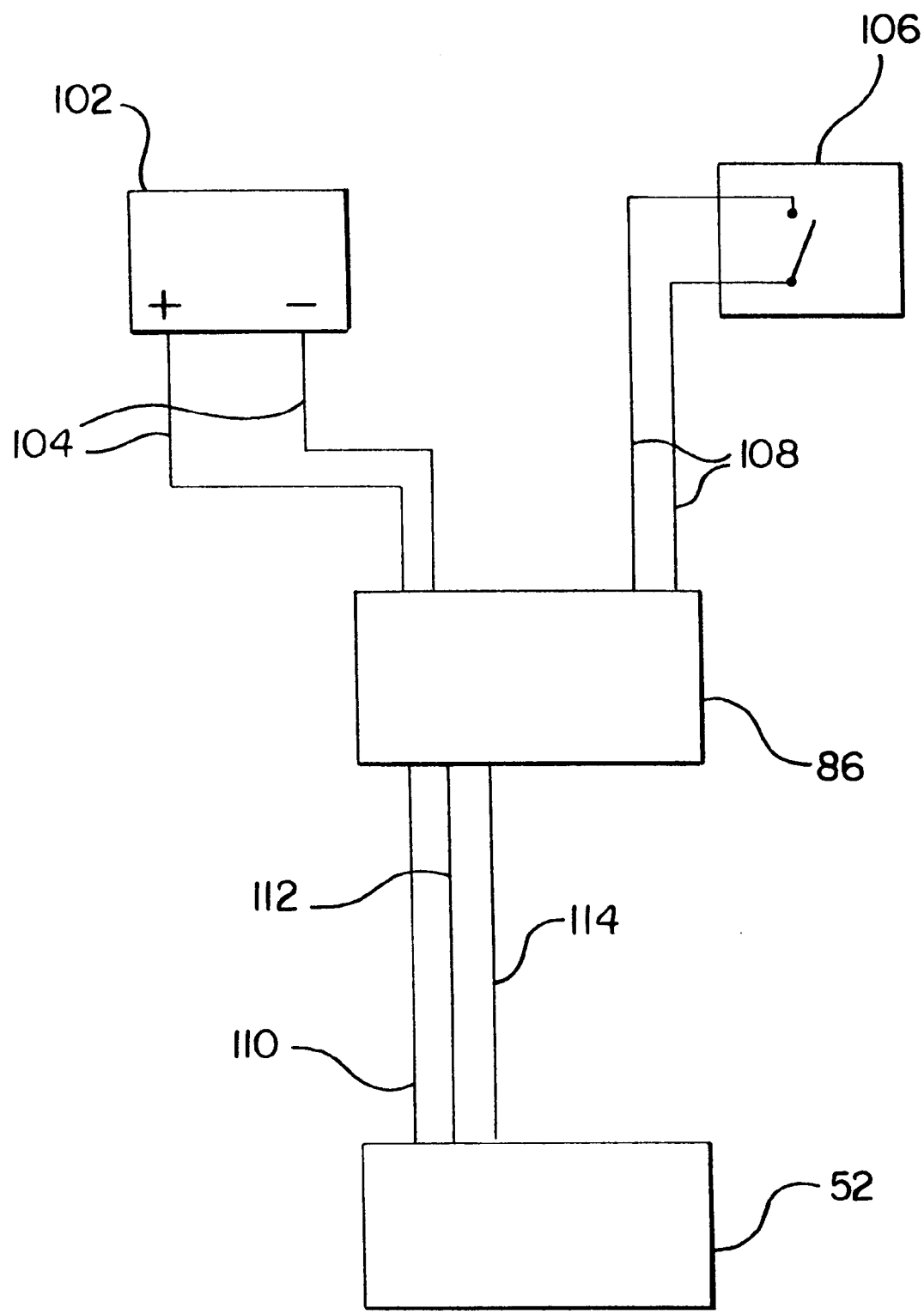
FIG. 7 is a diagram showing the electrical relationships between various parts relating to the light assembly of the present invention.

FIG. 7 is a diagram showing the electrical connection in the preferred assembly embodiment of the present invention. Through the preferred electrical connections and PCBs, the light assembly operates in three different scenarios. One scenario is when the flashlight is in the cradle and the glovebox door is closed. In this scenario, the flashlight is off (insured by tapered inner surface 94 of cradle 50), which opens a charge circuit and the flashlight's rechargeable battery is charged by the automobile battery.

The second scenario is when the flashlight is in the cradle and the glovebox door is open. In this scenario, the flashlight is on and powered by the automobile battery. At the same time, the rechargeable battery in the flashlight is being charged by the automobile battery.

The third scenario is when the flashlight is removed from the cradle. All circuits from the automobile battery are then opened, as there is no power sent to the flashlight and no charging of the rechargeable battery. The flashlight is then powered by its rechargeable battery.

To further describe the electrical connections to make this possible, FIG. 7 shows that automobile battery 102 is wired to cradle PCB 86 via wires 104. Glovebox switch 106 is wired to cradle PCB 86 via wires 108. Cradle PCB 86 is electrically connected to flashlight PCB 52 via terminals and floating pins as discussed above. Electrical connection 110 provides the automobile battery is ground. Electrical connection 112 operates when the glovebox is open via closed glovebox switch and the flashlight is in the cradle, thus, providing energy to light the flashlight in the glovebox. Electrical connection 114 provides the automobile battery positive when the flashlight is in place and the automobile battery charges rechargeable battery 54. The types of electrical connections and configurations of PCBs which would be suitable to carry out the invention are known or easily determined by those of ordinary skill in the art.

Alternative to having three electrical scenarios, it is possible to have only two which would merely turn on the flashlight when the glovebox door was open and turn off the flashlight when the glovebox door was closed.

Flashlight 14 may be made of known materials for making flashlights, such as plastic (polycarbonate), etc. Cradle 16 is preferably formed of plastic which has some flexibility so that the flashlight may be press fit into the cradle without breaking the cradle. In addition, the cradle and flashlight should be formed of materials which can withstand elevated temperatures, as they may experience elevated temperatures with extended use.

Having now fully described the invention, it will be apparent to one of ordinary skill in the art that many changes and modifications can be made thereto without departing from the spirit or scope of the invention as set forth herein.

What is claimed is:

1. A cradle for holding a flashlight in a glovebox of an automobile and for facilitating the use of the flashlight as a light for the glovebox, the cradle comprising:
    a plurality of connecting sides defining a cavity therebetween for holding the flashlight, one of the sides having an insertion opening to allow the flashlight to slide in and out of the cavity and a light opening to allow light from the flashlight to shine through the cradle; and
    a reflector attached to the cradle near the light opening to cause light from the flashlight to be reflected in a direction different from the direction the light is coming from the flashlight.

2. The cradle according to claim 1, wherein a side adjacent the side with the insertion opening having an inner surface which is tapered to gradually project more inward in the direction from the insertion opening toward the side opposite the insertion opening, the tapered inner surface present to gradually increase the snugness of the fit of the flashlight as it is being inserted into the cradle.

3. The cradle according to claim 1, wherein the plurality of sides includes a rectangular top side, a rectangular bottom side, two rectangular sides, and two rectangular ends, one of the two rectangular sides having the insertion opening therethrough, the bottom side having the light opening therethrough, and the reflector positioned so that light from the flashlight is caused to be reflected toward the light opening.

4. The cradle according to claim 3, wherein the bottom side has an accessory opening therethrough, the accessory opening present to allow any accessory parts on the flashlight to jut out from the cradle when the flashlight is stored in the cradle.

5. The cradle according to claim 4, wherein the side opposite the insertion opening has a cutaway at the bottom edge thereof, the insertion opening, the accessory opening, and the cutaway being in communication such that together they form one opening.

6. A cradle for holding a flashlight in a glovebox of an automobile and for facilitating the use of the flashlight as a light for the glovebox, the cradle comprising:
    a plurality of connecting sides defining a cavity therebetween for holding the flashlight, one of the sides having an insertion opening to allow the flashlight to slide in and out of the cavity and a light opening to allow light from the flashlight to shine through the cradle; and
    a side adjacent the side with the insertion opening having an inner surface which is tapered to gradually project more inward in the direction from the insertion opening toward the side opposite the insertion opening, the tapered inner surface present to gradually increase the snugness of the fit of the flashlight as it is being inserted into the cradle.

7. The cradle according to claim 6, wherein the plurality of sides includes a rectangular top side, a rectangular bottom side, two rectangular sides, and two rectangular ends, one of the two rectangular sides having the insertion opening therethrough, the bottom side having the light opening therethrough, the reflector positioned so that light from the flashlight is caused to be reflected toward the light opening, the bottom side having an accessory opening therethrough, the accessory opening present to allow any accessory parts on the flashlight to jut out from the cradle when the flashlight is stored in the cradle.

8. The cradle according to claim 7, wherein the side opposite the insertion opening has a cutaway at the bottom edge thereof, the insertion opening, the accessory opening, and the cutaway being in communication such that together they form one opening.

9. A dual-purpose light assembly for a glovebox of an automobile, comprising:
    a flashlight including a housing, a power supply inside the housing, a switch mounted on the housing, and a light source in the housing, the light source being controllable by the switch;
    a cradle for holding the flashlight, the cradle having a plurality of connecting sides defining a cavity therebetween for holding the flashlight, one of the sides having an insertion opening to allow the flashlight to slide in and out of the cavity and a light opening to allow light from the flashlight to shine through the cradle; and a reflector attached to the cradle near the light opening to cause light from the flashlight to be reflected in a direction different from the direction the light is coming from the flashlight.

10. The assembly according to claim 9, wherein a side adjacent the side with the insertion opening having an inner surface which is tapered to gradually project more inward in the direction from the insertion opening toward the side opposite the insertion opening and the switch on the flashlight being a push button switch which, when depressed turns off the flashlight, the tapered inner surface present to gradually increase the snugness of the fit of the flashlight as it is being inserted into the cradle and to cause the switch to be depressed, thereby turning off the flashlight.

11. The assembly according to claim 9, wherein the flashlight and the cavity are sized and shaped such that the flashlight fits in the cavity in a snug fit fashion.

12. The assembly according to claim 9, further comprising a cradle printed circuit board in the cradle, a flashlight printed circuit board in the flashlight, and electrical connections connecting the two printed circuit boards, thus allowing for electrical cooperation between the cradle and the flashlight.

13. The assembly according to claim 9, wherein the plurality of sides includes a rectangular top side, a rectangular bottom side, two rectangular sides, and two rectangular ends, one of the two rectangular sides having the insertion opening therethrough, and the bottom side having the light opening therethrough, the reflector positioned so that light from the flashlight is caused to be reflected toward the light opening.

14. The assembly according to claim 13, wherein the bottom side has an accessory opening therethrough, the accessory opening present to allow any accessory parts on the flashlight to jut out from the cradle.

15. The assembly according to claim 14, wherein the side opposite the insertion opening has a cutaway at the bottom edge thereof, the insertion opening, the accessory opening, and the cutaway being in communication such that together they form one opening.

16. A dual-purpose light assembly for a glovebox of an automobile, comprising:

a flashlight including a housing, a power supply inside the housing, a switch mounted on the housing, and a light source in the housing, the light source being controllable by the switch; and a cradle for holding the flashlight, the cradle having a plurality of connecting sides defining a cavity therebetween for holding the flashlight, one of the sides having an insertion opening to allow the flashlight to slide in and out of the cavity and a light opening to allow light from the flashlight to shine through the cradle; and a side adjacent the side with the insertion opening having an inner surface which is tapered to gradually project more inward in the direction from the insertion opening toward the side opposite the insertion opening and the switch on the flashlight being a push button switch which, when depressed turns off the flashlight, the tapered inner surface present to gradually increase the snugness of the fit of the flashlight as it is being inserted into the cradle and to cause the switch to be depressed, thus turning off the flashlight.

17. The assembly according to claim 16, wherein the flashlight and the cavity are sized and shaped such that the flashlight fits in the cavity in a snug fit fashion.

18. The assembly according to claim 16, further comprising a cradle printed circuit board in the cradle, a flashlight printed circuit board in the flashlight, and electrical connections connecting the two printed circuit boards, thus allowing for electrical cooperation between the cradle and the flashlight.

19. The assembly according to claim 16, wherein the plurality of sides includes a rectangular top side, a rectangular bottom side, two rectangular sides, and two rectangular ends, one of the two rectangular sides having the insertion opening therethrough, and the bottom side having the light opening therethrough, the reflector positioned so that light from the flashlight is caused to be reflected toward the light opening, the bottom side having an accessory opening therethrough, the accessory opening present to allow any accessory parts on the flashlight to jut out from the cradle when the flashlight is stored in the cradle.

20. The assembly according to claim 19, wherein the side opposite the side with the insertion opening has a cutaway at the bottom edge thereof, the insertion opening, the accessory opening, and the cutaway being in communication such that together they form one opening.

* * * * *